UNITED STATES PATENT OFFICE.

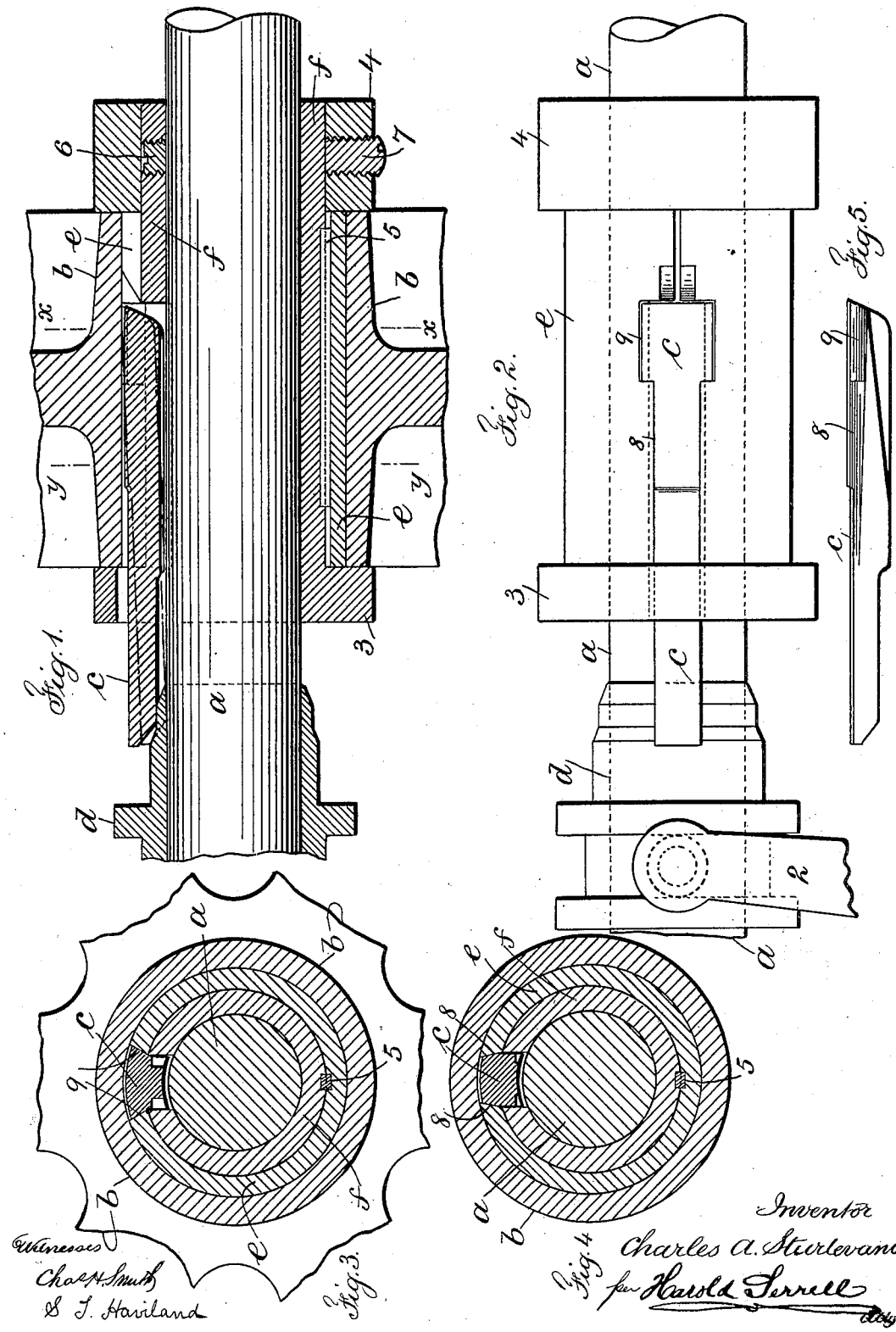

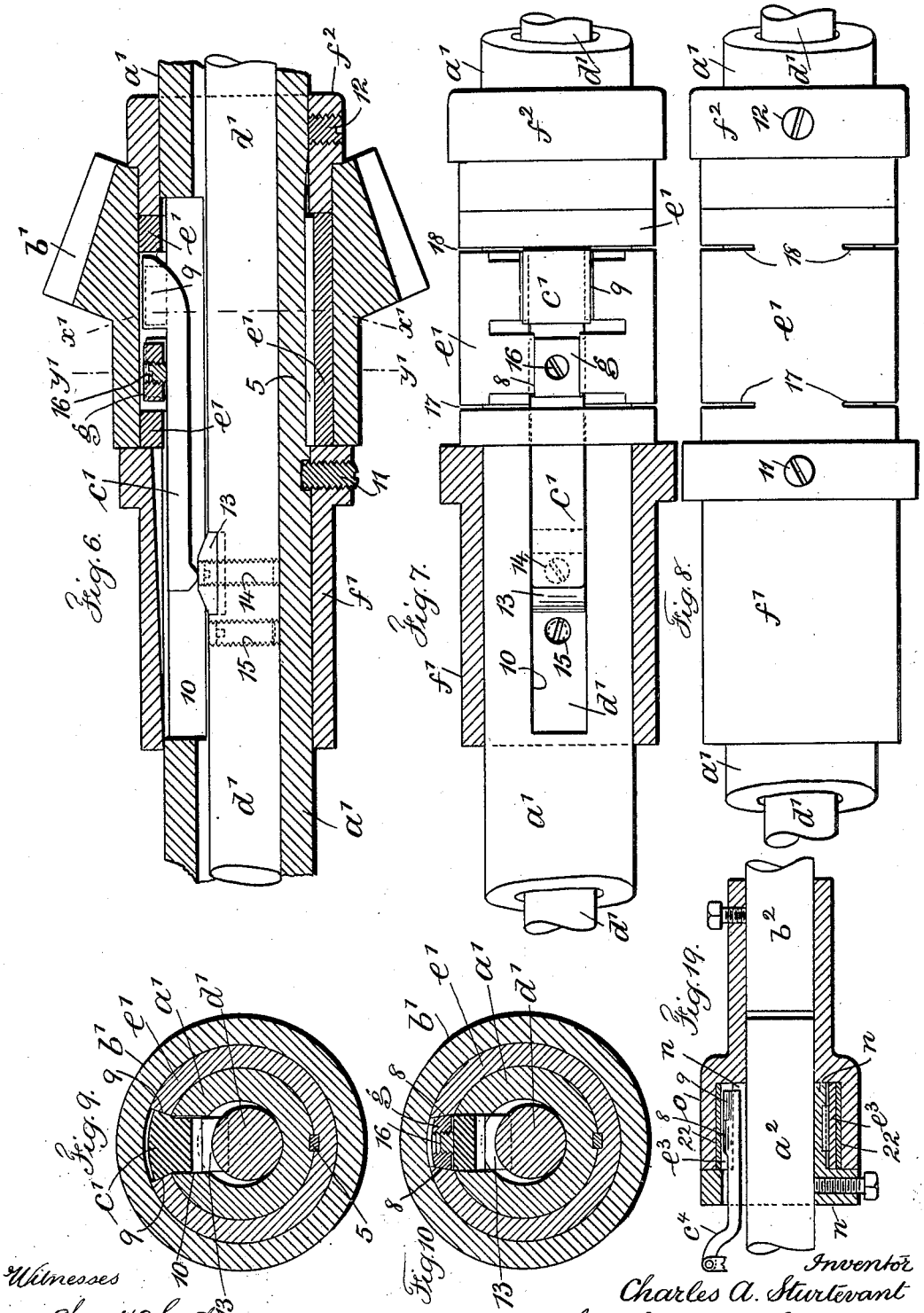

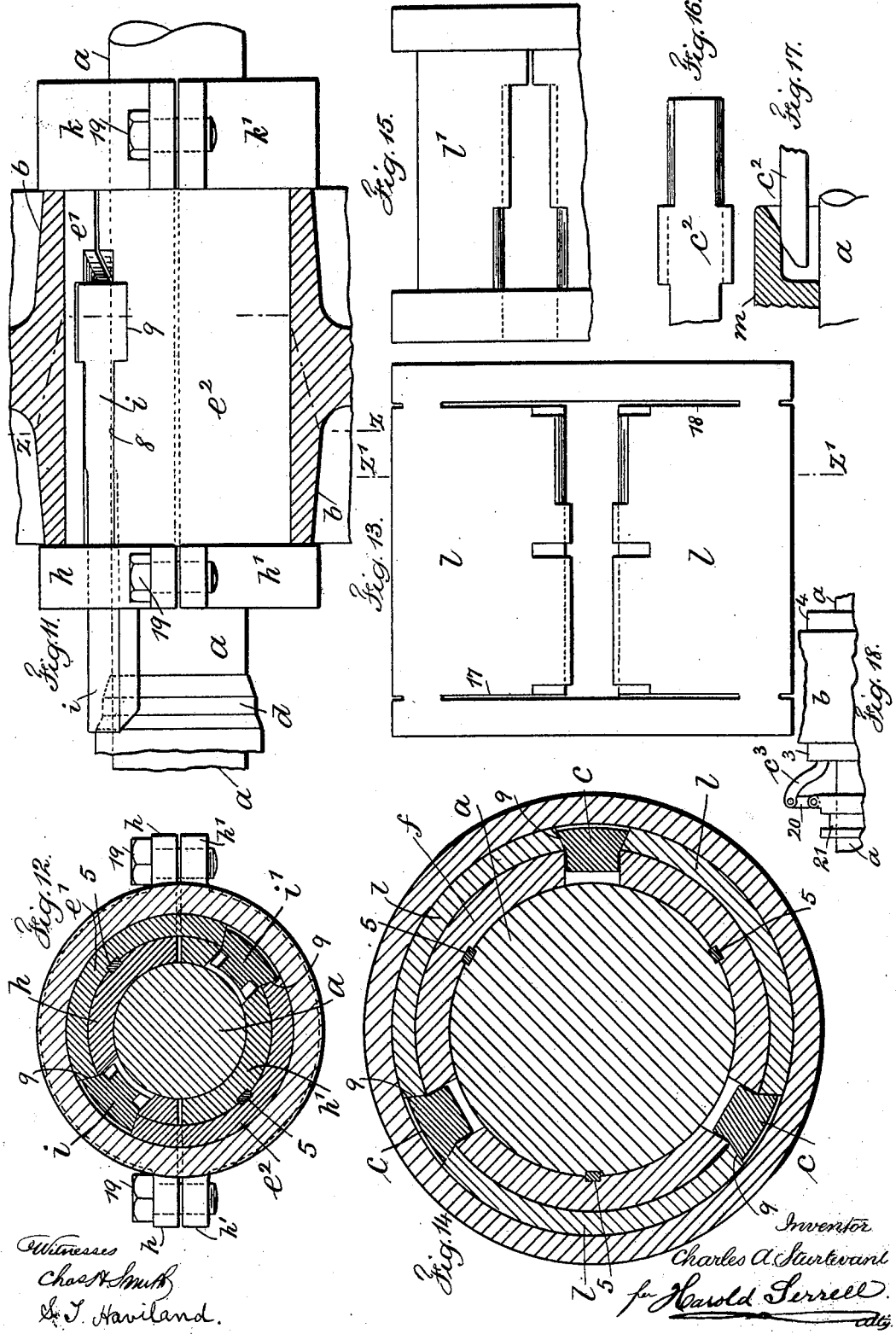

CHARLES A. STURTEVANT, OF PLAINFIELD, NEW JERSEY.

CLUTCH.

No. 827,475.　　　　　Specification of Letters Patent.　　　　Patented July 31, 1906.

Application filed January 18, 1904. Renewed October 24, 1905. Serial No. 284,130.

*To all whom it may concern:*

Be it known that I, CHARLES A. STURTEVANT, a citizen of the United States, residing at Plainfield, in the county of Union and State of New Jersey, have invented an Improvement in Clutches, of which the following is a specification.

My invention relates to devices adapted for transmitting power from a prime mover to a device to be actuated, and which devices are entirely under the control of an operator. These devices are particularly adapted to engage, actuate, and disengage mechanism interposed or between the prime mover and the device to be driven, and the same are particularly applicable to power-driven road-vehicles and the like.

My invention essentially comprises a lever-wedge, a movable member, and a split sleeve intermediate of a prime-mover shaft and a device to be actuated. The lever-wedge is provided with oppositely-inclined edges in opposite sets and an intermediate fulcrum. These edges simultaneously act upon parts of a split sleeve which in its opposite faces is provided with similar inclined edges, the said action spreading the sleeve and causing the same to bind upon an outside part.

In the initial position and movement the shaft of the prime mover and the split sleeve turn together with the lever-wedge inside the part that may be and is to be actuated. When the split sleeve is expanded, it exteriorly grips the interior of the part to be driven and the parts are at once coupled by the split sleeve and lever-wedge and all turn together.

In the drawings, Figure 1 is a longitudinal section and partial elevation of devices constituting the simpler form of my invention. Fig. 2 is a plan of the same with the device to be actuated removed. Fig. 3 is a cross-section and partial elevation at the dotted line $x\,x$ of Fig. 1. Fig. 4 is a cross-section at the dotted line $y\,y$ of Fig. 1, and Fig. 5 is a side view of the lever-wedge device shown in these figures. Fig. 6 is a longitudinal section and partial elevation of devices comprising the preferred form of my invention. Fig. 7 is a plan and partial horizontal section of the parts shown in Fig. 6 and with the device to be actuated removed. Fig. 8 is an inverted plan of the parts shown in Fig. 7. Fig. 9 is a cross-section at the dotted line $x'\,x'$ of Fig. 6, and Fig. 10 is a cross-section at the dotted line $y'\,y'$ of Fig. 6. Fig. 11 is a side elevation and partial vertical section, and Fig. 12 is a cross-section at the dotted line $z\,z$ of Fig. 11, said figures showing a form of my invention similar to the form shown in Figs. 1 to 5, inclusive, but in which the parts are double and divided. Fig. 13 is a plan of a form of split sleeve; and Fig. 14, a cross-section at $z'\,z'$ of Fig. 13, representing the said split sleeve and parts associated therewith similar to the parts shown in Fig. 12, but showing that three divisional parts instead of one or two may be employed. Fig. 15 is a partial plan of a form of split sleeve similar to that shown in Figs. 1 to 4, inclusive, but with the inclined surfaces reversed. Fig. 16 is a plan of the end of a lever-wedge with inclines suitable for the sleeve, Fig. 15. Fig. 17 is a partial vertical section and elevation of the end of the wedge, Fig. 16 showing a device for operating the same. Fig. 18 is a partial elevation showing a means for operating the lever-wedge, and Fig. 19 is a partial elevation and longitudinal section showing still another form of my invention.

Referring now to Figs. 1 to 5, inclusive, on sheet one of the drawings, $a$ represents a prime-mover shaft—that is to say, a shaft which is rotated by a prime mover of any desired character. $b$ is a device to be actuated, which also may be of any desired character, but is here shown as part of a pulley or wheel. $c$ represents a lever-wedge; $d$, a movable member in the shape of a conical sleeve surrounding the shaft $a$ and having a groove engaged by a part of an arm 2, the movement of which arm is adapted to slide the said movable member $d$ in opposite directions along the shaft. $e$ represents a split sleeve within the tubular bearing portion of the device or pulley $b$ to be driven. This split sleeve surrounds a sleeve $f$, on one end of which is a flange 3, the said sleeve being in part cut through for the base of the lever-wedge $c$. This sleeve $f$ is secured to the prime-mover shaft $a$ by a screw-pin 6, and there is a collar 4 around the free or right-hand end of the said sleeve $f$, and a screw-pin 7 connects this collar 4 to the said sleeve, holding between the flange 3 of the collar and the collar 4 at the other end of the sleeve $f$ the split sleeve $e$ and the tubular part of the device or pulley to be driven or actuated. The split sleeve $e$ and the sleeve $f$ are connected by a spline 5, placed between the parts at a point opposite to the place where the sleeve $e$ is split and employed to keep the two parts from turning with respect to each other. The lever-wedge $c$ is formed with oppositely-inclined edges 8, forming a pair or set, and with other oppositely-placed and inclined edges 9, forming a second pair or set. Between these is the fulcrum of the lever-wedge. This lever-wedge fits between opposite surfaces of the split sleeve $e$, and the surfaces of said sleeve in juxtaposition to the edges 8 and 9 are also inclined in corresponding directions. The left hand or free end of the lever-wedge $c$ or the under corner thereof is inclined, and the same is adapted to bear against the conical part or advancing end of the movable member $d$. When there is no engagement between the conical part of the movable member $d$ and the free end of the lever-wedge $c$, or, in other words, when this free edge may rest upon the surface of the prime-mover shaft $a$, as indicated by dotted lines in Fig. 1, the lever-wedge $c$ may be considered as substantially free or loose in the split sleeve $e$, in which position the prime-mover shaft $a$ may revolve and turn with it the sleeve $f$, the split sleeve $e$, the flange 3, the collar 4, and the lever-wedge $c$ without turning the device $b$ or pulley to be actuated. When the movable member or conical structure $d$ is moved by the arm 2 into the position Figs. 1 and 2, this free end of the lever is raised, and the lever is slightly rocked on the fulcrum between the sets of oppositely-inclined edges, thus raising the edges 8 against the edges of the split sleeve, (see Fig. 4,) and depressing the edges 9 against the edges of the split sleeve, (see Fig. 3,) and thus tending to expand the sleeve, so that the same may grip the inner surface of the device or pulley $b$ to be actuated. With the further movement of the movable conical member $d$ to the right the free end of the lever-wedge $c$ is caused to ride up the second conical surface onto the flat portion of this movable member, thus raising the edges 8 and depressing the edges 9 and expanding the split sleeve to its limit, where a very firm gripping hold of this split sleeve $e$ is had upon the inner surface of the pulley device $b$ to be actuated, so as to cause the same to turn with the aforesaid rotating parts to communicate the power of the prime-mover shaft to the pulley device $b$ to be utilized. This pulley $b$, or device to be actuated, may be a fly-wheel in a mechanism or the sprocket-wheel of a mechanism or a device to actuate the sprocket-wheel and chain of a power-driven road-vehicle.

Referring now to Figs. 6 to 10, inclusive, the prime-mover shaft $a'$ is shown as hollow and with a longitudinal aperture or incision 10. The device to be actuated is shown as a bevel-wheel and sleeve $b'$. In this form of the invention $c'$ is the lever-wedge. $d'$ is a movable member in the form of a bar within the hollow prime-mover shaft $a'$. $e'$ is the split expansion-sleeve. $f'$ $f^2$ are sleeves surrounding the prime-mover shaft $a'$, the sleeve $f'$ having a flange and secured to the said shaft $a'$ by a screw-pin 11, the sleeve $f^2$ being at an appreciable distance from the sleeve $f'$ along said shaft and secured thereto by a screw-pin 12. The split expansion-sleeve $e'$ comes between the sleeves $f'$ $f^2$. It is held to the shaft $a'$ by a spline 5, and the bevel-wheel device $b'$ to be actuated surrounds the split expansion-sleeve $e'$ for its major portion and at its end surrounds a portion of the sleeve $f^2$. The lever-wedge $c'$ is located in the aperture or incision 10 of the shaft $a'$. This lever-wedge $c'$ is provided, as hereinbefore described with reference to Figs. 1 to 5, inclusive, with oppositely-inclined edges 8 and 9 in pairs or sets with the fulcrum between the same. In this form of the invention, however, the oppositely-inclined edges 8 are not an integral part of the lever-wedge, as in the device shown in the aforesaid figures, but these edges are formed upon opposite sides of a loose wedge-block $g$, fitting between the parts of the split expansion-sleeve $e'$, the said sleeve having opposite inclined edges that correspond to the sets of edges 8 9. This wedge-block $g$ is provided with a central screw 16, passing down through an interiorly-threaded opening therein and adapted at its under surface to bear upon the upper surface of the lever-wedge $c'$. This screw 16 provides for adjusting the relation of the wedge-block $g$ to the lever-wedge $c'$, so as to bring the inclined edges thereof more or less quickly into engagement with the juxtaposed inclined edges of the split sleeve; but I do not limit myself to the use of this screw 16. It will be apparent that this wedge-block $g$ cannot get away from its location, and while it may move slightly and longitudinally of the prime-mover shaft it cannot come away on account of the opposite inclined edges, and the fulcrum in this device, as in the device shown in Figs. 1 to 5, remains between the sets of oppositely-inclined edges. The split expansion-sleeve acts outwardly against the interior of the bevel-wheel sleeve when expanded by the lever-wedge to connect the hollow prime-mover shaft through this lever-wedge with the bevel-wheel device $b'$ to be actuated. To effect this engagement, the left-hand free edge of the lever-wedge $c'$ is made with a downward projection inclined in opposite directions, and the movable member or bar $d'$ is provided with a cam-block 13, let into but raised above the surface of said bar and which agrees in width with the aperture 10 of the prime-mover shaft, so as to move longitudinally therein. This cam-block is held in position by a screw 14, and I may provide an adjusting-screw 15, passing through the movable member or bar $d'$ and adapted to bear on the opposite side thereof from the cam-block 13, so as to raise the said bar and increase the pressure of the cam-block against the beveled end of the lever-wedge $c'$. In the position shown in Fig. 6 this beveled free end of the lever-wedge $c'$ is in forceful contact with the cam-block 13 and bears upon the highest point thereof. Consequently the oppositely-inclined edges of the said lever-wedge have been forcefully brought into action against the opposite juxtaposed edges of the split expansion-sleeve $e'$, as shown in Figs. 9 and 10, to force the same outward and engage the inner surface of the bevel-wheel device $b'$ to be actuated. When this movable bar member $d'$ is drawn along in either direction, so as to remove the cam-block 13 from contact with the lever-wedge $c'$, this pressure and tension are removed and the split expansion-sleeve $e'$ is free from contact with the device $b'$ to be driven, so that the prime mover $a'$ and the parts associated therewith may turn freely within this device $b'$ to be actuated without moving the same. It will be apparent, especially from Figs. 7 and 8, that a maximum amount of expansibility is provided for the split sleeve $e'$, because the same is circumferentially split or incised at 17 18, leaving, as will be apparent from Fig. 8, an appreciably solid portion thereof diametrically opposite to the portion acted upon by the lever-wedge $c'$.

Referring to Figs. 11 and 12 and to the description of Figs. 1 to 5, inclusive, it will be apparent that this form of the invention is very much like the form described in Figs. 1 to 5, the difference mainly consisting in employing a divided sleeve $h$ $h'$ in place of the sleeve $f$, the flange being also divided and connected by bolts 19, also in employing a divided collar $k$ $k'$, connected by similar bolts 19. Each section or divided sleeve $h$ $h'$ is split and prepared for the reception of the lever-wedges $i$ $i'$ at opposite sides of the prime-mover shaft $a$. The expansion-sleeve $e'$ is made in two parts connected to the divided sleeve by two splines 5, that keep the parts from moving with respect to the divided sleeve $h$ $h'$, and it is split or incised in two places to receive the two lever-wedges. An object of making these parts in two pieces is so that they can be applied to a machine extant without taking the same to pieces. The pulley $b$ may be in one piece or be divided. This form of the invention is substantially the double of the form shown in Figs. 1 to 5. It probably possesses the advantage of quicker and more even action than the simpler form of the invention, Figs. 1 to 5. Otherwise the parts entering into the structure are similarly made, similarly operated by a movable conical member $d$, and perform the same functions as the device described and shown in Figs. 1 to 5.

Figs. 13 and 14 show a triple condition in contradistinction to the double condition of Figs. 11 and 12 and the single condition of Figs. 1 to 5, inclusive, the expansion-sleeve $l$ in this being shown as split in three parts with circumferential incisions that leave appreciably solid places for holding the parts of the sleeve intact.

Referring to Figs. 15 to 17, inclusive, in Fig. 15 $l$ represents an expansion-sleeve having inclined opposite edges that are the reverse of those shown in Figs. 1 to 5, inclusive, Fig. 16 showing the operative end of the lever-wedge $c^2$ with oppositely-inclined edges in sets adapted for use in connection with the expansion-sleeve $l'$. Fig. 17 shows a cam-collar $m$ for operating the free end of the lever-wedge $c^2$, and it will be apparent from Figs. 15 to 17 that this lever-wedge must have its free end depressed toward the prime-mover shaft because of the inclination of the operative edges of the expansion-sleeve and wedge, while in Figs. 1 to 5, inclusive, the free end of the lever-wedge is moved outwardly by the conical portion of the movable member $d$.

Fig. 18 illustrates that the free end of the lever-wedge $c^3$ may be bent outwardly and upwardly and connected by a link 20 to a sliding collar 21. The movement of this collar along the shaft by any suitable device, such as the arm shown in Fig. 2, will cause the swinging of the link 20 and the movement of the free bent-up end of the lever-wedge for its operation and the expansion of the split expansion-sleeve of the structure.

In the form of invention shown in Fig. 19 the device to be driven may be in the form of a shaft $b^2$ axially in line with the prime-mover shaft $a^2$, and a stepped sleeve $o$, surrounding the juxtaposed ends of these shafts, is secured to the shaft or device $b^2$. A sleeve $n$, pinned to the prime-mover shaft and similar to the sleeve $f$, Fig. 1, may in this form be employed, and between this sleeve $n$ and the larger portion of the stepped sleeve $o$ is placed the split expansion-sleeve $e^3$ and an intermediate sleeve 22, of such material as vulcanized fiber, the said split sleeve being acted upon by a lever-wedge $c^4$, similar to those hereinbefore described for the connection of the prime-mover shaft through the intervention of the lever-wedge and the expansion-sleeve $e^3$ with the stepped sleeve $o$ for communicating rotary movement and power to the stepped sleeve $o$ and shaft $b^2$ to be operated.

I claim as my invention—

1. The combination with a prime-mover shaft and a device to be actuated, of devices intermediate thereof and comprising a rocking lever-wedge with intermediate fulcrum and with sets of inclined edges at either side of said fulcrum, a movable member for operating the wedge, and a split expansible sleeve actuated by the lever-wedge to connect the parts and cause them to turn in unison.

2. The combination with a prime-mover shaft and a device to be actuated, of devices intermediate thereof and comprising a rocking lever-wedge with intermediate fulcrum and with sets of inclined edges at either side of said fulcrum, a movable member for operating the wedge, and a split expansible sleeve actuated at opposite points by the lever-wedge to connect the parts and cause them to turn in unison.

3. The combination with a prime-mover shaft and a device to be actuated, of devices intermediate thereof and comprising a lever-wedge with oppositely-inclined edges in opposite sets and an intermediate fulcrum, a movable member for operating the wedge and a split expansible sleeve having juxtaposed and contacting inclined edges coinciding with the oppositely-inclined edges of the lever-wedge and actuated by the lever-wedge to connect the parts and cause them to turn in unison.

4. The combination with the prime-mover shaft and a device to be actuated, of a lever-wedge having oppositely-inclined edges in opposite sets and an intermediate fulcrum and a free end prolongation, a movable member and means for actuating the same to bring said movable member into forceful relation with the free end of the lever-wedge to cause the movement thereof, and a split expansible sleeve having oppositely-inclined edges in opposite sets in juxtaposed relation and contact with the oppositely-inclined edges of the lever-wedge, and said split expansible sleeve located within the device to be actuated and when expanded coming into internal contact therewith so as to connect the parts and cause them to turn in unison.

5. The combination with a hollow prime-mover shaft and a device to be actuated, sleeves surrounding and secured to said prime mover shaft with the device to be actuated intermediate of the sleeves, and said prime mover and shaft having a longitudinal aperture or incision, of a movable bar member within the tubular prime-mover shaft, a lever-wedge located in the longitudinal aperture of the prime-mover shaft and having oppositely-inclined edges in opposite sets and an intermediate fulcrum, a split expansible sleeve surrounding the tubular prime-mover shaft and directly within the device to be actuated and having oppositely-inclined edges in opposite sets contacting with the oppositely-inclined edges of the lever-wedge, and means connected with the movable bar member for actuating the said lever-wedge to expand the sleeve and connect the parts and cause them to turn in unison.

6. The combination with a hollow prime-mover shaft and a device to be actuated, sleeves surrounding and secured to said prime-mover shaft with the device to be actuated intermediate of the sleeves and said prime-mover shaft having a longitudinal aperture or incision, of a movable bar member within the tubular prime-mover shaft, a lever-wedge located in the longitudinal aperture of the prime-mover shaft and at one end having oppositely-inclined edges forming a set, an adjustable wedge-block in line with said end of the lever-wedge and having oppositely-inclined edges forming an opposite set between which is an intermediate fulcrum, a split expansible sleeve surrounding the tubular prime-mover shaft and directly within the device to be actuated and having oppositely-inclined edges in opposite sets contacting with the oppositely-inclined edges at the end of the lever-wedge and the oppositely-inclined edges of said adjustable wedge-block, and means connected with the movable bar member for actuating the said lever-wedge to expand the sleeve and connect the parts and cause them to turn in unison.

7. The combination with a hollow prime-mover shaft and a device to be actuated, sleeves surrounding and secured to said prime-mover shaft with the device to be actuated intermediate of the sleeves, and said prime mover and shaft having a longitudinal aperture or incision, of a movable bar member within the tubular prime-mover shaft, a lever-wedge located in the longitudinal aperture of the prime-mover shaft and having oppositely-inclined edges in opposite sets and an intermediate fulcrum, a split expansible sleeve surrounding the tubular prime-mover shaft and directly within the device to be actuated and having oppositely-inclined edges in opposite sets contacting with the oppositely-inclined edges of the lever-wedge, means connected with the movable bar member for actuating the said lever-wedge to expand the sleeve and connect the parts and cause them to turn in unison, and means connected with the movable bar member for adjusting the relation of the same to the hollow prime-mover shaft providing for the wear of the parts.

Signed by me this 14th day of January, 1904.

CHAS. A. STURTEVANT.

Witnesses:
  GEO. T. PINCKNEY,
  S. T. HAVILAND.